(12) United States Patent
Salim et al.

(10) Patent No.: US 8,510,367 B2
(45) Date of Patent: Aug. 13, 2013

(54) DISTRIBUTIVE REAL TIME INFORMATION DISSEMINATION AND INFORMATION GATHERING SYSTEM AND SERVICE WITH DYNAMICALLY HARMONIZED COMMUNICATION CHANNELS

(75) Inventors: Mohammad S. Salim, Boulder, CO (US); Barbara J. Rossner, Boulder, CO (US); Ronald M. Barber, Boulder, CO (US)

(73) Assignee: Corybant, Inc., Boulder, CO (US)

( * ) Notice: Subject to any disclaimer, the term of this patent is extended or adjusted under 35 U.S.C. 154(b) by 445 days.

(21) Appl. No.: 12/050,018

(22) Filed: Mar. 17, 2008

(65) Prior Publication Data

US 2009/0006975 A1    Jan. 1, 2009

Related U.S. Application Data

(63) Continuation-in-part of application No. 12/025,206, filed on Feb. 4, 2008, which is a continuation of application No. 09/765,964, filed on Jan. 19, 2001, now Pat. No. 7,328,233.

(60) Provisional application No. 60/176,983, filed on Jan. 19, 2000.

(51) Int. Cl.
*G06F 15/16*    (2006.01)

(52) U.S. Cl.
USPC .............. 709/202; 709/224; 709/217; 726/2; 726/6

(58) Field of Classification Search
USPC .......................................... 709/202
See application file for complete search history.

(56) References Cited

U.S. PATENT DOCUMENTS

| | | | | |
|---|---|---|---|---|
| 6,128,657 | A * | 10/2000 | Okanoya et al. | 709/224 |
| 6,581,051 | B1 * | 6/2003 | Ueno et al. | 706/47 |
| 6,947,989 | B2 * | 9/2005 | Gullotta et al. | 709/226 |
| 7,562,382 | B2 * | 7/2009 | Hinton et al. | 726/2 |
| 2007/0043735 | A1 * | 2/2007 | Bodin et al. | 707/10 |

* cited by examiner

*Primary Examiner* — Hua Fan
(74) *Attorney, Agent, or Firm* — Donald R. Boys; Central Coast Patent Agency, Inc.

(57) ABSTRACT

A computer network processor for managing information access, exchange, and interaction over a communications network has at least one input port for receiving input from the network, a first portion of memory for storing an operations framework, the framework supporting an information model including attributes and at least one communications system interface, a second portion of memory for caching information; and at least one interface to a at least one communications interface. The processor performs role-based task execution and related workflow based in part on defined attributes of the information model and in part on instruction solicited from a user through the at least one communications interface.

3 Claims, 6 Drawing Sheets

DISTRIBUTIVE REAL TIME INFORMATION DISSEMINATION AND INFORMATION GATHERING SYSTEM AND SERVICE WITH DYNAMICALLY HARMONIZED COMMUNICATION CHANNELS

CROSS-REFERENCE TO RELATED APPLICATIONS

The present invention is a continuation-in-part to a copending application Ser. No. 12/025,206, filed on Feb. 4, 2008, which claimed priority to U.S. patent application Ser. No. 09/765,964, filed on Jan. 19, 2001 and issued as U.S. Pat. No. 7,328,233 on Feb. 5, 2008, which claimed priority to a U.S. provisional patent application Ser. No. 60/176,983, filed Jan. 19, 2000, entitled "Datasource Harmonizer". Disclosures of all of the prior documents are incorporated herein in their entirety at least by reference.

BACKGROUND OF THE INVENTION

1. Field of the Invention

The present invention is in the field of network communication including resource sharing and notification and pertains particularly to a distributive and dynamically scalable user-centric network system enabling communication and resource-based task performance using communication channels that are dynamically harmonized for user preference, enterprise policy, and modality.

2. Discussion of the State of the Art

In the field of network-supported information access and data sharing, there is a wide range of networked computer systems supported by software that enable users and systems to access and share information. The inventors have pointed out the need for a flexible distributed information access and exchange system that is not specifically tied to a hard programming language or a strict structural implementation and deployment strategy.

The inventors are aware of an information access and exchange system supported by a flexible information model known to the inventors as an Active Information Model (AIM), an attribute of which is a personal agent or "Active Agent" spawned on behalf of a user of the network. The Active Information Model is a distributed information system that includes one or more personal information portals containing Active Agents. The system is deployed within an Active Information Framework (AIF) that provides for a unified architectural approach to disparate devices, information services, and protocols. In a preferred embodiment, the system of this invention can be implemented as a configurable network-based service that provides information access and exchange capabilities to authorized users and systems defined by the users' "roles" within the related enterprises.

The system described above in the cross-reference section as U.S. patent application Ser. No. 09/765,964 is also referenced herein as Salim and Rossner et al. The system relies on the information model termed an Active Information Model that has various defined attributes including roles, categories (datasources), tasks, and actions. In this system roles are represented by personal active information agents termed Active Agents by the inventors. The system leverages a distributive architecture and enables access and exchange of information in a variety of ways utilizing existing network communication infrastructures and mediums.

In various service embodiments described by Salim and Rossner et al, the Active Agents of the information model are executable components that cooperate with one another in many instances to perform information access tasks, transaction tasks, communication and notification tasks, and other functions based on a user-centric modality that may influence how workflow is orchestrated and carried out by the system.

It has occurred to the inventors that, from the perspective of an enterprise, a networked information access and exchange system that embodies an Active Information Model may be quickly and economically scaled up to meet the demands of a federated system of enterprises or multiple independent departments of a large enterprise. Furthermore, from the standpoint of the individual user, mobile access might be more fully enabled using a variety of communications and computing devices through various network or sub-network access points.

Therefore, what is further needed in the art is a system and service through which one may create and practice a distributive network-based information access, notification, communication, and data sharing system using dynamically harmonized communication and media channels. A system such as this could greatly improve the efficiency and flexibility of a multi-enterprise or department service organization.

SUMMARY OF THE INVENTION

The problem stated above is that flexibility, usability, and scalability is desirable for an information access and exchange system, but many of the conventional means for providing a secure information network also create obstacles to greater flexibility, usability, and scalability. The inventors therefore considered functional elements of an information network looking for elements that exhibit less limitation and more opportunity for ease of design, ease of deployment, ease of service integration, and ease of system evolution and feature enhancement.

The functionality of every network-based information access and exchange system is harnessed or reined in by the limitations of programming, equipment capacities, data formatting, system compatibility to outside services, and available workflow capabilities. Most such information systems employ proprietary formats and standards that may not be interchangeable with those of other systems, networks and resources within the broad set of context that is required by the collection of the enterprises that serve and are served by a single individual.

The inventors realized in an inventive moment that if, from the point of design and deployment, an information access and exchange system could be more accurately reflective of the exiting relationships between the individuals and the enterprise, the standardized formats and protocols, could be leveraged to fulfill existing enterprise service needs in a way that will not inhibit future expansion and feature additions and will provide for significant efficiency related to enterprise use of the system. The inventors therefore constructed a unique service that facilitated enterprises in the development, deployment, and subsequent access to and use of, in some cases, information access systems tailored to the service models and objectives of those enterprises. The result was that development and deployment timeframes were greatly reduced, infrastructure and equipment costs were greatly reduced, and enterprises conducted business with much greater speed and efficiency.

Accordingly, in one embodiment of the invention, a computer network processor for managing information access, exchange, and interaction over a communications network is provided. The network processor includes at least one input port for receiving input from the network, a first portion of memory for storing an operations framework, the framework supporting an Active Information Model including attributes and at least one communications system interface, a second portion of memory for caching information, and at least one interface to a at least one communications interface. The network processor is characterized in that it performs role-based task execution and related workflow based in part on defined attributes of the information model and in part on instruction solicited from a user or another Active Agent or trigger event through the at least one communications interface.

According to another aspect of the present invention, in a network-based information access and exchange system, a method for aggregating data by proxy from disparate data sources and using the data aggregated in a single presentation. The steps include (a) creating abstract definitions of the datasource categories, (b) creating abstract definitions of roles representing users who access one or more of the datasource categories, as each category may be associated with one or more roles, (c) creating abstract definitions of workflow, that is to say relationships between the roles where an action by one role may serve as a trigger event for an action by another role, and where such action may be one where a role serves to harmonize information that is available to it and to deliver such information to other nodes, thereby serving as a datasource to those nodes within the context of that specific workflow (d) through a communication interface integrated with the information access and exchange system, invoking an action that is defined for a role having associations to other roles, and (e) fulfilling the process of delivering harmonized information at the point of the communication interface according to the parameters for harmonization, aggregation and presentation.

According to another aspect of the present invention, in a network-based information access and exchange system, a method is provided for harmonizing data from various datasources representing remote branches of a company for analysis and presentations. The system includes the steps (a) normalizing the information from various datasources (b) compiling the information which may include invoking company specific business rules in selecting specific data elements that are target for presenting within the harmonization context that is in effect, for example based on policy or accounting rules, (c) performing the analysis and creating the appropriate reports and (d) formatting the data for the appropriate presentation format (e.g. for viewing on a presentation screen or spreadsheet format).

DETAILED DESCRIPTION

The inventors provide an improved network-based information access and delivery system that may be distributed across multiple independent enterprise departments or between multiple distributed information systems and communications services. The improved network system will be described in more enabling detail below.

Figure 1:
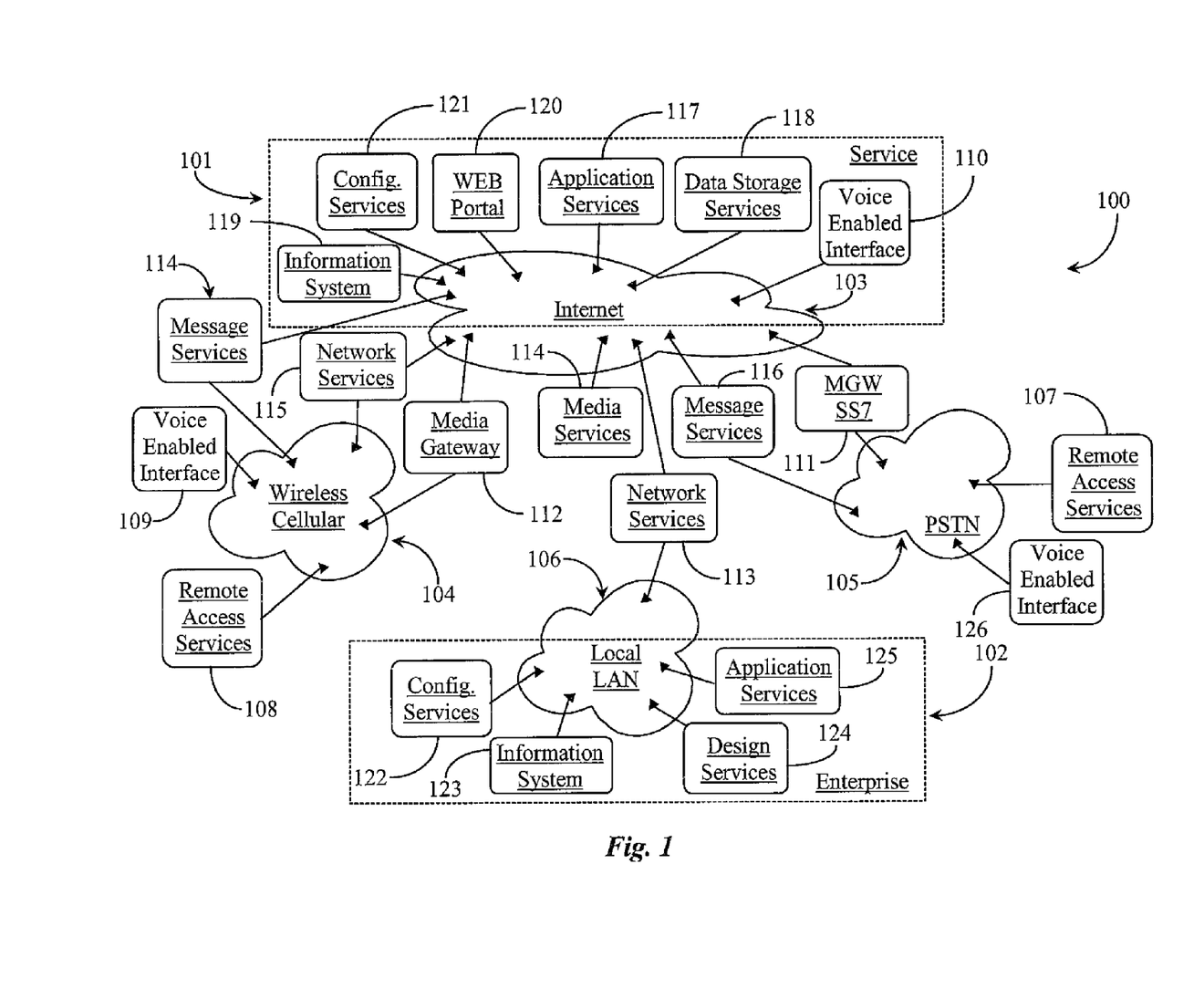
FIG. 1 is a block diagram illustrating a network environment supporting a distributed information access, notification and collaboration service according to an embodiment of the present invention.

FIG. 1 is a block diagram illustrating a network environment 100 supporting a distributed information access service 101 according to an embodiment of the present invention. Network environment 100 is a conglomerate of multiple communications networks and data networks. The Internet network 101 is illustrated in this example as a primary data network over which the present invention may be practiced on a larger scale eclipsing single domains like the physical domain of a typical enterprise with a central information store.

The primary carrier network may be some other wide-area-network other than the Internet like a corporate WAN, Intranet or Ethernet without departing from the spirit and scope of the invention. The inventors choose the Internet network 101 as a good example of a highly accessible network infrastructure over which many of the standardized protocols used in practice of the invention are inherent. One with skill in the art appreciate the blending of different sub-networks and the Internet network and the variety of messaging protocols and transport layers that are supported including Universal Datagram Protocol (UDP), Transfer Control Protocol over Internet Protocol (TCP/IP) Hypertext Transfer Protocol (HTTP) and others.

In this example, the system of the present invention will be generically referred to herein as an information access system although the system is certainly not limited to access of information. The system may also be used for data synchronization, collaboration and data exchange services, transaction initiation and fulfillment, billing and other financial service tasks, service chain fulfillment, and other network supported workflow-based business tasks such as dispatching or alternate notification. In the application referenced in this specification as a priority document the term enterprise is used to identify any endeavor involving one or more individuals with one or more shared objective(s), with a specific recognition that an individual may be involved in multiple such enterprises, therefore the present invention is not limited to a single enterprise in terms of information or modality. A federated system of enterprises might serve as one good example of a cooperative that may use one or more versions of the system of the invention for various objectives such as business management, service provision, resource allocation, customer care, and data management.

Network environment 100 includes communications carrier network that may be used to access the system including a wireless cellular network 104 and the well-known public switched telephone network (PSTN). Likewise, the system may make contact with users and may establish communication sessions with persons considered campaign targets in certain outbound embodiments.

An enterprise domain 102 is illustrated in this example and represents any enterprise that may utilize the service of the invention to provide services, information access and sharing, collaboration, billing, transaction processing, and/or other important business services. It is noted herein that only one enterprise 102 is illustrated in this example however multiple enterprises may, using services of the invention, configure and adapt their own versions of the system for their enterprise specific needs.

Enterprise 102 includes a local area network (LAN) 106 used to support enterprise systems, and enterprise personnel performing enterprise related tasks. Enterprise personnel (not illustrated) may connect to LAN 106 using LAN-connected computing appliances including wireless network-enabled devices. From the perspective of the enterprise, certain personnel and enterprise systems may perform certain tasks and have access to specific data "categories" under the auspices of a defined "role", which implies the existence of an Active Agent representing each specific role described with reference to Salim and Rossner et al relative to the Active Information Model (AIM). Much information describing the Active Information Model, the creation and management thereof and core metrics that support overlying services is detailed in one or more of the co-pending patent applications.

Flexibility in both system evolution and in system access and interaction modalities is discussed in this specification. Such features are at least in part enabled by ability to abstract information from one source for presentation in a desired way over a preferred media or communication channel to a recipient system, Active Agent, or human. In one embodiment, enterprise personnel associated with "roles" supported by Active Agents, may be entirely mobile at times and may participate fully in the enterprise activities enabled by the information access system of the invention from remote locations and/or disparate platforms. Users may access services through various communication networks including networks 104 and 105 or Internet 103 using their preferred access medium and communication devices including browsers, wired and wireless telephony devices, and personal digital assistants (PDAs).

In one embodiment of the present invention, enterprise 102 is facilitated by service 101 in the process of "building" or "designing" an information system that is adapted specifically to enterprise requirements in the context of a single enterprise or one that cooperates with other enterprises and/or government regulatory agencies having processes and systems that also may be integrated into the information system. The exact configuration of services and capabilities of an information system for a specific enterprise depends on the nature of the business the enterprise or collaborative body engages in.

In this logical diagram, service 101 may take an active role in providing services for one or more enterprises that have purchased or subscribed to specific information system services offered such as enterprise 102. This concept is similar to that of a telecommunication company offering telephony services to an organization to increase the exposure of the organization's services to the outside world.

Existing network architecture and services may be leveraged to provide a unique and secure multi-modal communication and data exchange environment for users of information services of the invention as is illustrated logically herein. For example, Local Area Network (LAN) 106 has access to Internet 103 using network services 113, which may be provided by service 101 or by a third party service provider. Network services 113 may include both wired and wireless Internet access services using a variety of known techniques. In a preferred embodiment high-speed connectivity is provided to enable Internet access from any point on LAN 106. Ti-based services, broadband, DSL, or other services may be leveraged to provide connectivity. Services may include secure virtual private network (VPN) services and the like.

Access to services may also be provided to enterprise personnel and, in some cases, automated systems through other access points in the network environment. For example, remote access services 108 may be provided within wireless cellular network 104 to remote and mobile enterprise personnel. Remote access services 107 may be provided through the Public Switched Telephony network (PSTN network) 107 to home-based personnel. Hosted or third party Internet service providers may be leveraged through the PSTN network and wireless network services, either hosted or third party may be available through wireless network 104. In this example, wireless cellular network 104 has access to Internet network 103 through network services 1115, which may be provided by any one of wireless Internet service providers. A media gateway (MGW) 112 is illustrated between wireless cellular network 104 and Internet 103 providing format and coding translation between the networks for multimedia communications.

PSTN 105 has seamless access to Internet network 103 via a media gateway (MGW) 111, which may also include Signaling System no. 7 (SS-7) call control functionality. Remote users assuming "role" responsibilities may, using the existing network access and integration techniques, perform actions and tasks according to enterprise rules and may enjoy full functionality of the system of the invention as would users connected to enterprise LAN 106. An important goal of the configurable information access service of the present invention is to enable fully mobile users to have full participation relative to their assigned tasks within the enterprise. Remote users may have Active Agent instances activated through a proxy server (not illustrated) in some cases where the proxy functions as an Active Agent enabling full utilization of the system and representation of the user using virtually any type of device, e.g. telephones two way radios, or personal digital assistant (PDA), capable of accessing the network.

Service 101 may host its own information system 119, which may be adapted by partition and other data segregation mechanism to facilitate multiple clients of the service with extra storage space for enterprise information. A web portal is provided within service domain 101 and is adapted to enable enterprise clients to interact with the service to obtain the tools required for building their information networks using their own local equipment and data facilities as well as those hosted by the service. Web portal 120 may also serve as an access portal for users of configured information services. Other important system facilities include application services illustrated herein as application services 125 in enterprise 102 and application services 117 hosted by service 101. Depending on the nature and size of the organization, application development for the enterprise information system may be a distributed service. Internal applications may be developed within enterprise 125 that may interact with applications developed by service 101 for enterprise clients.

Service 101 may host data storage, backup, and archival services for enterprise clients illustrated herein by data storage services 118. Enterprise 102 may also host data storage facilities (not illustrated). Configuration services for defining how an information system will function for users may be provided both in service 101 and in enterprise 102. Configuration files may include rules for completing workflow-based tasks and actions. Users of the system may configure certain preferences for communication modalities, devices used, how information is presented, and so on. Configuration files may also describe the Active Information Model and such files may be installed both in enterprise 102 and at service domain 101. Enterprise 102 includes design services 124 that may be partially or wholly enabled by service 101 via generic tools for building system functionality and defining business rules and workflow.

Services 121, 117, 118, 125, 124, and 122 may include one or more data stores or warehouses accessible through client/server relationship and query process that are site-specific data stores or warehouses. These may include older legacy systems within an enterprise adapted by middleware for integration to newer systems for harmonized information exchange. Information system 123 may include archival systems, customer relations management (CRM) systems, operations management systems, and so on. Some of this information may also be hosted by system 101 on behalf of the enterprise and may be accessed through network 103 during enterprise operations.

A client of service 101 may be a single enterprise or a group of enterprises that cooperate to provide services. Using distributed services enables the enterprise or multiple entities to subscribe to existing service capabilities for their information systems and to add functionality and capabilities as needed. Therefore, in one embodiment of the invention, an information system takes shape through collaborative effort and is distributed in terms of data storage, servers, and access points. In this way flexibility in architecting a functional information system is optimized enabling an enterprise to begin with basic requirements and functionality, possibly within a single department or group and then to develop additional service modalities and to integrate additional departments and groups, as new business needs are identified.

Information systems in general provide for data abstraction from specific formats and presentations into a standardized format that can be easily reformatted and presented in different ways. However, a system that effectively exchanges information across disparate communication modalities must be able to consider contextual and policy information in addition to formatting requirements. One example of this expanded scope are the series of issues that are addressed by a system capable of sending or retrieving an email message using a telephone, which is a subject of another patent application by the same inventors.

Another example is where the nature of each communication modality determines certain essential qualities, such as interactivity or security, of the devices that are deployed in that modality. In such cases the elements of data are dynamically adjusted for a given modality based on policy and user preferences and then presented appropriately for that modality. If there is a reason to transfer from the active modality, for example when a person interacting with the system using a telephone requests a to be connected to help desk, the information is dynamically reconstructed to adapt to the new modality as well as extended to include the existing context at the time of the transfer. In the process of adapting and extending the information the order of presentation may change or additional information may be included, e.g. the standing or disposition of the individual requesting transfer for the benefit of the help desk operator) or excluded (e.g. help prompts that are not needed by the operator).

The inventors intend in part that the logical arrangement of components illustrated in FIG. 1 demonstrate that it is possible using existing network infrastructures, namely the Internet, connected sub-networks, PSTN, and cellular networks to support a secure, configured information access system within which it is possible to "blend" media channels and communications channels between disparate communications devices and across disparate communications networks using the services of the present invention embodied in one embodiment in a hardware appliance not illustrated in this logical example of network environment 100 but described later in this specification.

Enterprise users may access their configured information networks from within the enterprise or from any remote fixed or mobile location directing access to both enterprise and service-hosted facilities. For example, users may access their information systems through a personal information portal such as may be provided via Web services such as web portal 120 or by proxy using a voice enabled interface such as an interactive voice response (IVR) system. For discussion purposes voice enabled interfaces are illustrated herein in wireless network 104 as voice enabled interface 109; in PSTN 105 as voice enabled interface 126; and in Internet 101 as voice enabled interface 110. Users may also access their information networks through messaging services such as email message services using post office protocol (POP) or Internet message access protocol (IMAP), for example. Short Message Service (SMS) and Multimedia Messaging Service (MMS) may also be supported. Message services 114 is illustrated in this example for Internet based servers (IMAP) or (POP) and wireless network based services (SMS) and (MMS). Although it is not illustrated in this example, facsimile systems may also be supported as both access systems and delivery systems. In terms of system access for performing workflow, all of the communications mediums may be utilized in a single flow that accomplishes an enterprise goal. Blending the communication channels refers to abstracting information received from one channel and preparing the information for presentation and delivery over another channel in the form of text documents, application-specific and industry standard formatted documents, video messaging, pictures and video embodied as a communication or attached to a message may also be incorporated in information distribution, exchange, and access wherein personalization, template loading, and/or some blending regarding media types and media access or delivery channels may occur according to personalization requirements of individual users. For example, a message may be distributed among users whereby the original format and file type of a document attachment might be automatically converted into another file type for one or more recipients based on enterprise policy, service agreements, or that user's preference.

Data in storage according to one schema may be retrieved and harmonized for storage of the same information in another schema wherein the data storage facilities may be remote from one another or serve different purposes within the enterprise. The service of the invention leverages an aggregate of standard mechanisms and technologies for data abstraction and propagation in various formats and forms. In addition user personal information portals enable personalized views upon access to information in a way that might be specified according to the particular role of the user and where such views may also be influenced by configured user preferences.

It will be apparent to one with skill in the art of network information systems and component distribution that an information system configuration may support multiple users of a same enterprise or users belonging to more than one cooperating enterprise such as in a federated system. Likewise, one user may maintain a role that encompasses activities of the user relative to more than one enterprise. One example of this might be an independent sales representative that works for more than one company. Such a salesman can have access to different categories (datasources), sale forms for different products or services, different client bases and contacts and different workflows generic to each of the different sales activities that might be involved.

One information access system may be created for a group of companies serviced by the sales rep and other sales reps. Other Active Agents of such a system might be in place that may represent sales management roles, product service roles, logistical support roles, billing services roles and other facets involved in servicing customers of the group of companies. Many such roles may be third party or otherwise externally contracted "services" configured as part of the overall information network. An architectural view illustrating a group of enterprises engaged in practice of the invention according to one embodiment is provided in more detail below.

Figure 2:
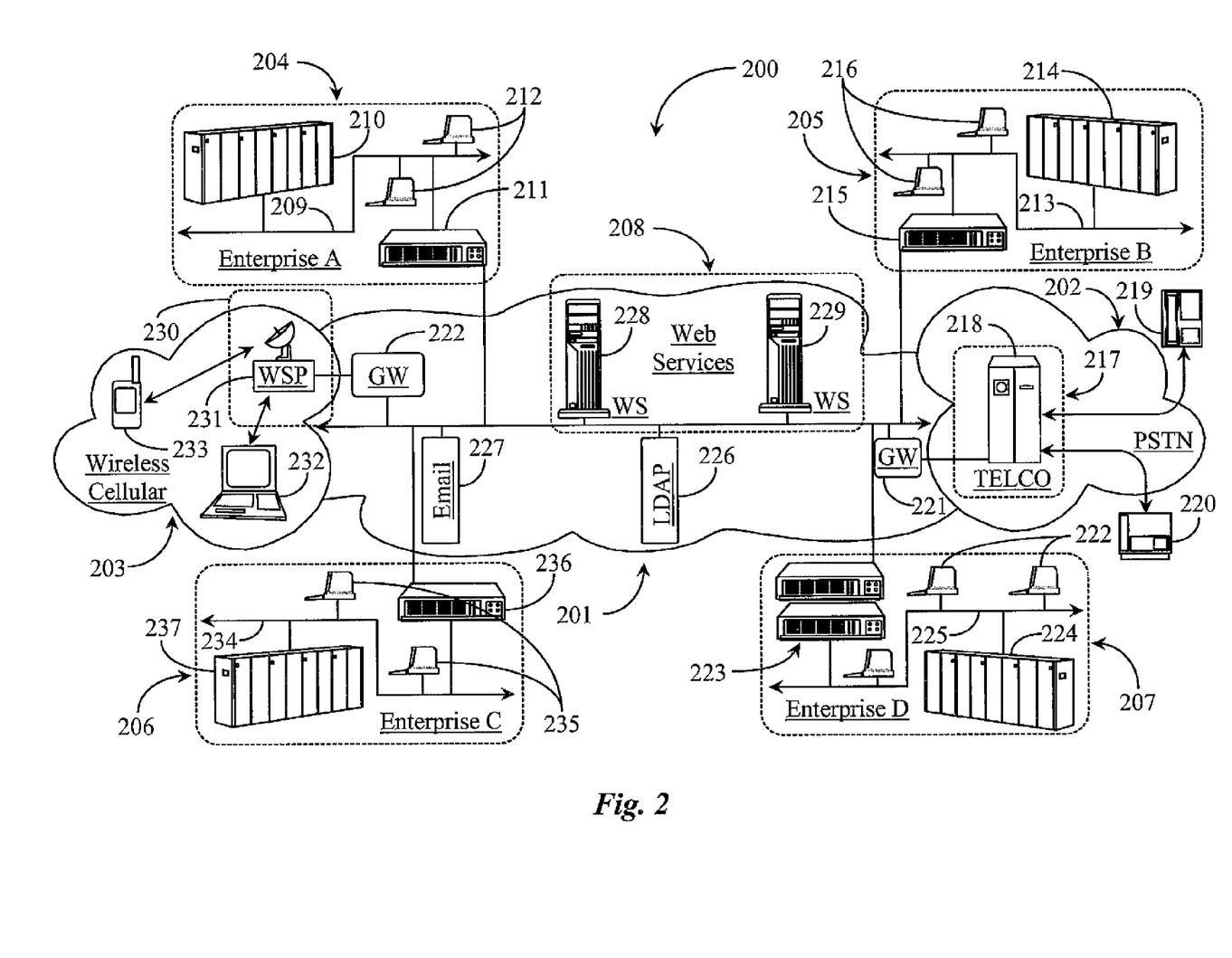
FIG. 2 is an architectural overview of a distributed information access and collaboration service shared by multiple enterprises according to an embodiment of the present invention.

FIG. 2 is an architectural overview of a federated network 200 utilizing a distributed information access and collaboration system according to an embodiment of the present invention. Federated network 200 is defined by a specific group of enterprises illustrated herein as an enterprise 204 (A), an enterprise 205 (B), an enterprise 206 (C), and an enterprise 207 (D). For simplicity in description, each enterprise 204-207 illustrated is identically equipped although this is not a requirement of the present invention.

Enterprise 204 (A) contains an information system 210 representing in abstract all of the information made accessible through that particular enterprise. In this example information system 210 is connected to and accessible via an enterprise LAN 209. For the purposes of the invention in this and other examples similar goals can be achieved if such networks were a Virtual Private Network (VPN) or simply secure or context-specific connections over the public Internet or enterprise Intranet. Enterprise workstations or terminals are illustrated within enterprise 204 (A) as workstations or terminals 212 connected to LAN 209. Workstations 212 represent any computerized station or system having connection to LAN 209 and access to enterprise information system 210.

In this embodiment, enterprise 204 (A) includes a computerized hardware appliance 211, branded by the inventors with the descriptive term datasource harmonizer (dsH), that embodies the service capabilities and core functionality of the service of the invention. Appliance 211 provides connectivity to information made available from external sources such as data source categories, communications systems, messaging service, media services and Active Agents that are operating within other instances of the appliance distributed throughout the network hosted by the other enterprises. Appliance 211 also embodies integration of workflow with access and distribution of information as it relates to a single process performed on behalf of a single user.

The inventors have coined the phrase "user centric information system" to refer to an environment such as the one depicted in the network environment 200 and "Active Information Model", portions of which may be embodied within appliance 211 providing Active Agents that perform functions on behalf of the users, defining the roles of the users within an enterprise and the specific capabilities and task assignments for those roles as they relate to that enterprise. In a federated environment such as network environment 200, each enterprise may include an Active Information Model that represents the entire federation. The enterprises in this case may each provide unique services to affect an overall process or experience that is fulfilled with contributions from any or all of the enterprises. In another embodiment, each enterprise may be identically endowed with same or very similar Active Information Model and may be positioned to facilitate servicing of customers (users) from any one or a combination of the enterprises based, for example, on customer need. An example may be where a request may be escalated to different enterprises (a different service context) as a customer chooses to escalate a request for service or the Active Agents working on behalf of the customer requests a change of context for service. A situation where such an example is realized is a case when a customer using an IVR service requests to be transferred to a help desk or a similar situation may occur when the Active Agent supporting the customer determines that the customer is having trouble and requests a transfer on behalf of the customer. In either case the help desk receives the service context and serves as an alternate service point that contributes to the fulfillment of the customer's experience.

For the sake of avoiding redundancy, enterprise 205 (B) includes LAN 213 supporting information system 214, computer terminals 216 and appliance 215. Enterprise 206 (C) includes LAN 234 supporting information system 237, computer terminals 235, and appliance 236. Enterprise 207 (D) includes a LAN 225 supporting an information system 224, computer terminals 222, and a stack of harmonizer appliances 223. In this case, enterprise 207 (D) has scaled up capacity over the other enterprises by deploying more than on appliance 223, which has a very small footprint and is re-entrant relative to system scaling.

Each appliance has a finite processing capacity based on such parameters as number of roles or "Active Agents" the number of users and/or automated systems performing workflow using the system framework. As an enterprise grows more appliances may be added to increase capacity.

Active Agents supported within each enterprise may have associations to other Active Agents within specific enterprises and across multiple enterprises. Information stored within systems 210, 213, 224, and 237 may be visible to an Active Agent through another Active Agent that has a defined association (relationship) with it. Therefore, the information relative to the entire federation is stored amongst the cooperating enterprises in distributed fashion over the network. There are no geographic limits to the practice of the present invention considering the networks leveraged to support access to and exchange of the information.

In this basic example, access to the overall system encompassing all of the enterprises is available from within any of the enterprises and from any connected sub networks such as wireless cellular network 203 and from PSTN 202 as was illustrated further above in FIG. 1. PSTN 202 includes a telecommunications carrier (TELCO) 217 operating a telephony switch 218 connected to Internet 202 via a gateway (GW) 221. A user operating a telephone 219 may access the network via an interactive voice response system made available through TELCO 217 or hosted by one or more of the enterprises. The system might be accessed using a PSTN-connected fax machine 220. Telephone 219 and fax machine 220 may also represent customer end devices that are destination points of network workflow tasks.

From wireless network 203, users may access the system using a cellular telephone 233 or a laptop terminal 232. A wireless service provider (WSP) 231 has connection to the system through a GW 222. Internet 202 includes Web services provider 208. Web services 208 hosts a Web server (WS) 228 and a WS 229. WS 228 and 229 may be user access points or "personal information portals" (PIPs) where users can access services, make configuration changes, update preferences, retrieve personal views of system data, configurations, state, and so on. A lightweight directory access protocol (LDAP) server is provided for illustrative purpose only in that network directory services may be used to locate data source categories and other network resources that can be leveraged or may become available to users of the system. An email server 227 is also illustrated and represents any messaging service.

The user-facing side of a personal information portal (PIP) for a user might be browser-based such as with a computer terminal like terminal 212, laptop 232 or cellular telephone 233 or a wired telephone 219. A personal digital assistant (PDA) may also contain a browser-based component used to access services. Typically speaking, a user PIP enables the user to make changes related to how information is presented, viewed, distributed, received, etc. A typical browser-based implementation implies one or more interactive pages through which a user may manage certain aspects of the service.

In application, appliances like appliance 211 have network cards enabling access to specific systems available on the network. In this example, the harmonizer appliances in each enterprise have direct connections to Internet network 202. This illustration is logical only. In actual practice, separate networks may be provided, for example from appliance 211 directly to some other resource like a local database, a local rules base, a telephony dialing server such as a Computer Assisted Telephony Interface (CATI), outbound or inbound (dial-in) IVR server, or other like component systems. The appliance (211) runs an application framework termed an "active information framework" by the inventors. The functionality of the harmonizer appliances is at least in part determined by the nature of the deployed information access system. For example, it might be that email and telephony are the only two media channel options for a user. In some systems data access, form population, form presentation and reporting are the major functions of the Active Agents. In still other systems notification of customers or other system agents is the primary function. There are many variant types of systems that can be utilized. Most can be multi-faceted using the core Active Information Model to define roles, categories, relations, and associations between roles, and workflow related tasks to be performed.

User of the service of the invention may practice the invention according to their specific implementations once they are installed and tested. In a system shared by multiple entities, new functionality may be created with respect to the Active Information Model of one of the entities without need to update the core systems of all of the other entities unless there is a required association between roles of two or more of the entities. In this case, the deployment of the new role attributes may be handled through distribution of configuration files that contain the required attribute definitions, relationships, and workflow additions if any. In this way, an Active Information Model may continue to evolve and yet still function as a complete model.

Multiple data sources may be accessed from a single point in the network, for example, to populate a single form that then may be faxed, emailed, posted, or otherwise shared over the network with one or more defined recipients. In such an example, an Active Agent may be assigned to get a form, populate the form with the required data and then send the form to a recipient. An example of this might be that of a sales contract for example. An Active Agent performing this task may have required associations to other Active Agents that must also perform some of the task according to the workflow. The Active Agent may be triggered by another Active Agent command or request, or by some defined event such as an email, a voice response during a telephone interaction, or even a state event trigger such as maturation of an account or some time-based constraint placed against data held in a data source.

An information and exchange system built with tools supplied by the service of the invention may have automated workflow and tasks that involve manual workflow. An example of this might be in a sales automation environment a manual task for reviewing and signing a contract might be required before the signed contract is sent to a recipient. Moreover some other tasks might involve more traditional channels like regular express mailings, money deposits by wire, notary services, or other required certification processes performed by third party services or government agencies. Such tasks may be included in workflow of the system and may be triggered as well as automated tasks performed by systems. The abstraction level of the Active Information Model allows an enterprise or a group of enterprises to construct information and exchange service that is exactly tailored to their business goals.

Figure 3:
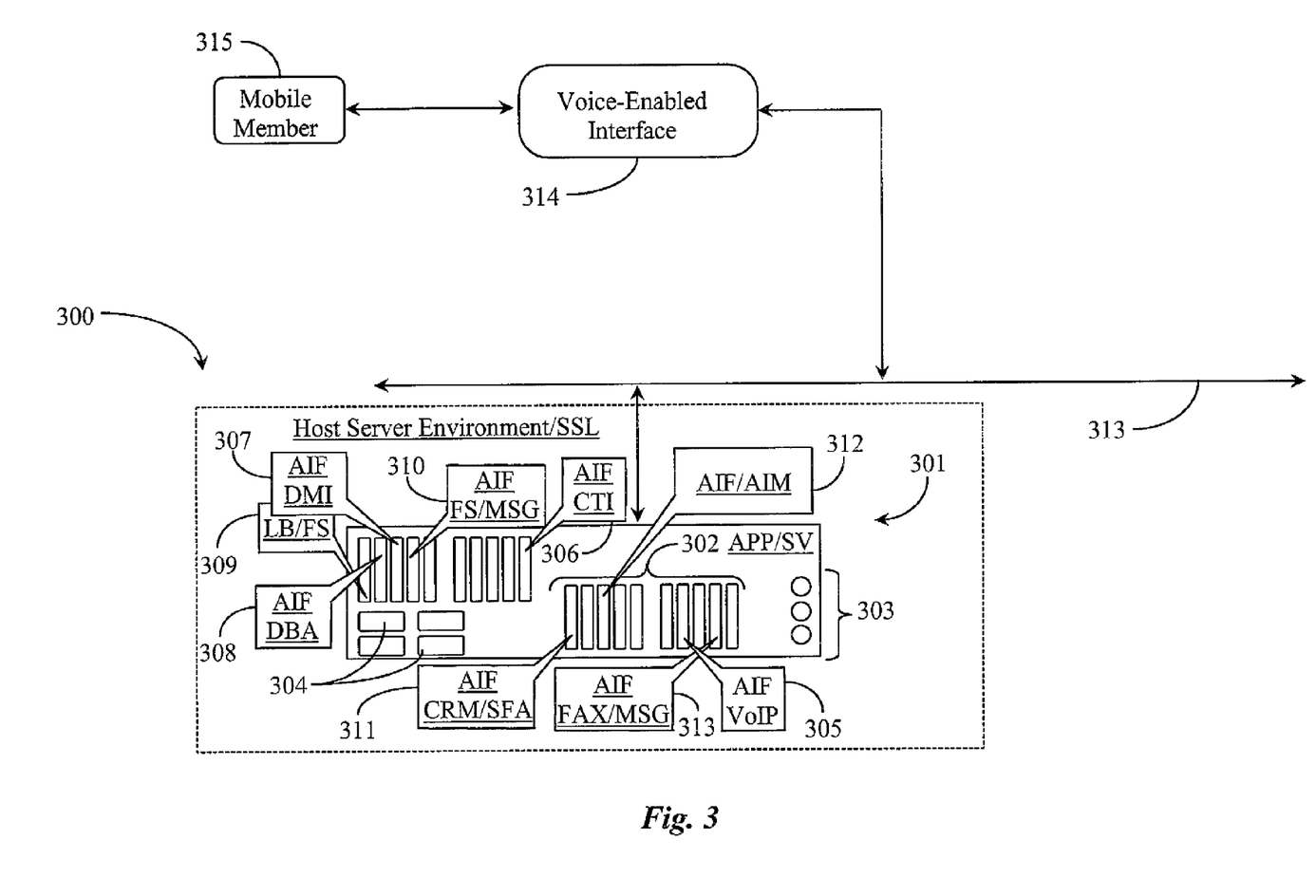
FIG. 3 is a block diagram of a networked computing appliance serving as a network point activity management node according to an embodiment of the present invention.

FIG. 3 is a block diagram of a networked computing appliance 300 serving as an Active Agent management node according to an embodiment of the present invention. Appliance 300 is analogous to appliances 211, 215, 223, and 236 illustrated above in FIG. 2. In this example, appliance 300 is accessible to users of the service of the invention through a hosted server environment and the appliance itself may be configured as an application server (APP/SV). Access to appliance 300 may be achieved through a Web interface hosted in the server or in a proxy appliance connected to the server. Wireless application protocols (WAP) may be enabled for server access from cellular and other light wireless devices.

In one embodiment, a mobile member 315 (a users) of the service may access device 300 through a voice enabled interface 314 such as an IVR system supported by a served voice application. Voice recognition may be supported as well as touch-tone interaction for options selection. Appliance 300 includes a plurality of service components hosed within processor elements to enhance its expandability while preserving a turnkey and physically portable package for situations where such a package is appropriate.

As described further above, appliance 300 has a small footprint and a finite capacity in terms of memory, processor capacity, and connection load capacity. Therefore appliance 300 includes a load balance fail over system (LB/FS) 309 that may automatically activate during overload conditions to pass workload to another connected appliance. Proactive workload management techniques may be implemented for load balancing of workload between two or more appliances connected together.

One possible deployment of appliance 300 in a single node configuration may be a dedicated practice management or CRM system. Another deployment may be in a node in a multiply connected communication network for a security detail. In such a situation the Active Information Model within each node is the operative security scenario and within the context of this model the information exchange is managed and the input stimuli is processed.

On the front end, trigger events, for example from attached devices or Active Agents from this or other appliances, or inputs from authorized system users are processed against policies that are defined within the Active Information Model. The appliance spawns instances of Active Agent based on roles that include the tasks and workflow requirements as trigger events are posted. Appliance 300 is essentially a proxy command center supported by the active information framework within which support for the Active Information Model and interface capabilities to other appliance 300 or external systems are provided. Appliance 300 then serves as a proxy in many instances between a requesting system or user and services.

Appliance 300 is configurable and reconfigurable through plug-in type installation of computerized card devices 302, which may include system interfaces and information support devices. One such device is LB/FS card 309, which is configured to perform load balancing and failover services in the event too much load is placed on the appliance. Appliance 300 includes at least one card device for specifying at least one Active Information Model (AIM) 312 of an enterprise and the active information framework (AIF).

AIF supports all of the basic functions for appliance 300, however new extensions to the AIF functions to support additional services can be added to the appliance by providing the new components on an information device plugged into the appliance. In general, an AIF supported database access (DBA) interface 308 is provided for finding and getting data from local data sources. In one embodiment, external data source interfaces may be supported for data access over the prevailing network. DBA interface 308 may also support movement of data between data sources (data migration), data caching, and data source updating.

An AIF supported document management interface (DMI) 307 is provided for managing variant document formatting and form population and report generation tasks. Interface device 307 may enable the appliance to retrieve a specified form or document template to be populated with data. DMI 307 may cooperate with DBA 308 in form population or population of document templates. An AIF supported file service and electronic messaging (FS/MSG) interface 310 is provided to enable access to hosted or third-party electronic message services and file sharing or retrieval services. Access to email services, SMS services and MMS services may be supported. Policy can dictate that the message presentation and content that is delivered to each individual is based on their role or other attributes such as security clearance, number of times they have accessed the system, etc. Appliance 300 includes an AIF supported Computer Telephony Integration (CTI) interface to one or more CTI-enabled telephony servers, devices or switches. CTI interface 306 allows the system to perform outbound calling and notification tasks such as calling personnel to confirm appointments or to confirm service person availability for pending job requirements. Notifications may include emergency alerts, notice of tickets for sale, and other types of notifications that might be sent out to a target list of customers or a pre-selected list of personnel. In such cases the Active Information Model serves according to enterprise policies as well as individual considerations, for example in order to determine if a person is eligible to be contacted at a specific moment.

Appliance 300 includes an AIF supported interface 311 to Customer Relations Management (CRM) and or Sales Force Application (SFA) systems. CRM/SFA interface 311 allows access to these systems for the purpose of performing follow-up requests and tasks related to sales and customer relations management. Appliance 300 includes an AIF supported interface 313 to Fax messaging (FAX/MSG) services. These services may include E-Fax service and traditional telephone-based Fax services. Appliance 300 also includes an AIF supported interface 305 to Voice Over Internet Protocol (VoIP) services.

Appliance 300 may include miscellaneous ports 304 and 303 for connecting peripheral devices or for chaining multiple appliances together or the like. Reset, power on, power off, and other features such as slot or bank disable switches and the like may be provided. In this example LAN 313 supports appliance 300 and voice enabled interface 314 may interact with appliance 300. Voice enabled interface 314 facilitates system access for mobile member 315 in one example.

It is noted herein that the AIF may have instances thereof created for other devices that may be made accessible for installation to those devices such as downloaded installable files, browser plug-ins, standalone desktop application, or server based interface. Appliance 300 may be provided with more or fewer slots for docking service cards and more or fewer features than those described herein without departing from the spirit and scope of the present invention. For example, a notification system might only require interfaces to telephone and messaging service in addition to DBA services.

In practice of the present invention an authorized user of the system such as mobile member 315 may use a telephone or another telephony device to interact with voice-enabled interface 314, which has a service application running on it. The mobile member may be authenticated by device 300 before any interaction is possible. Appliance 300 spawns an instance of an Active Agent representing the role and tasks that are at least part of the duties of member 315.

The features of the appliance may be activated by users based on the role of the user. If a user does not have access to CRM/SFA data, then that feature is not visible to that user. User authentication may be distributed to third party systems through which access to an information system is attempted. In a client/server environment, secure socket layer (SSL) and other encryption methods can be implemented. Enterprise firewall systems may also be installed in front of the appliance.

Individual users may personalize how they view the system and how the system interacts with their connected devices and applications. For example, a user might configure a map button on a PDA device as a trigger to tell the system to get directions to the next appointment or job site. A user may set preferences relative to email such as for certain expected emails from identified addresses or an identified group or category, deliver the content by telephone to a specified cellular number. A user may finish a transaction on one device that was initiated from another device without having to start over. A user may call into the system and use a voice application to select a customer form and the system may populate the form with the relevant known data while the user can add new data by voice for inclusion into one or more fields of the form.

Many varied types of information systems can be supported by appliance 300 including customer notification systems, automated survey systems, parts and service fulfillment systems, collaboration systems for large projects involving multiple enterprises and project stages, and other conceivable systems. System development is much accelerated and system flexibility, scalability, and evolution abilities are much improved. The level of personalization a user may have with the system depends in part on rules governing the role that the user has with the enterprise and in part of the user's preferences and access device parameters. Blended communications may be configured in many different ways for differing systems.

The inventors have developed several different types of information access and exchange systems for different clients. Some systems are complex interaction and collaboration systems while others are very simple event triggered notification systems. The appliance of the invention can be used to enable user-centric control of how the system performs tasks and how the system may be viewed from the perspective of the user.

Appliance 300 embodies personal information agents or Active Agents for active roles in the system. A user then may have a role that is very diverse from that of another user using the same appliance. A sale executive, for example, may have multiple personal services registered and configured for access by appliance 300 in such ways that the executive can have workflow performed automatically while indisposed or while busy traveling. Personal information services like calendars, travel services, financial information services, social networking services, and others may be part of the overall flow and flexibility of what the Active Agent for that executive can be made to do. It may make calls, send messages, set appointments, make payments, arrange for purchase of tickets for travel or entertainment events, reserve a table at a restaurant, fill out a form, and other tasks that might be conceived and defined as sets of workflow.

Figure 4:
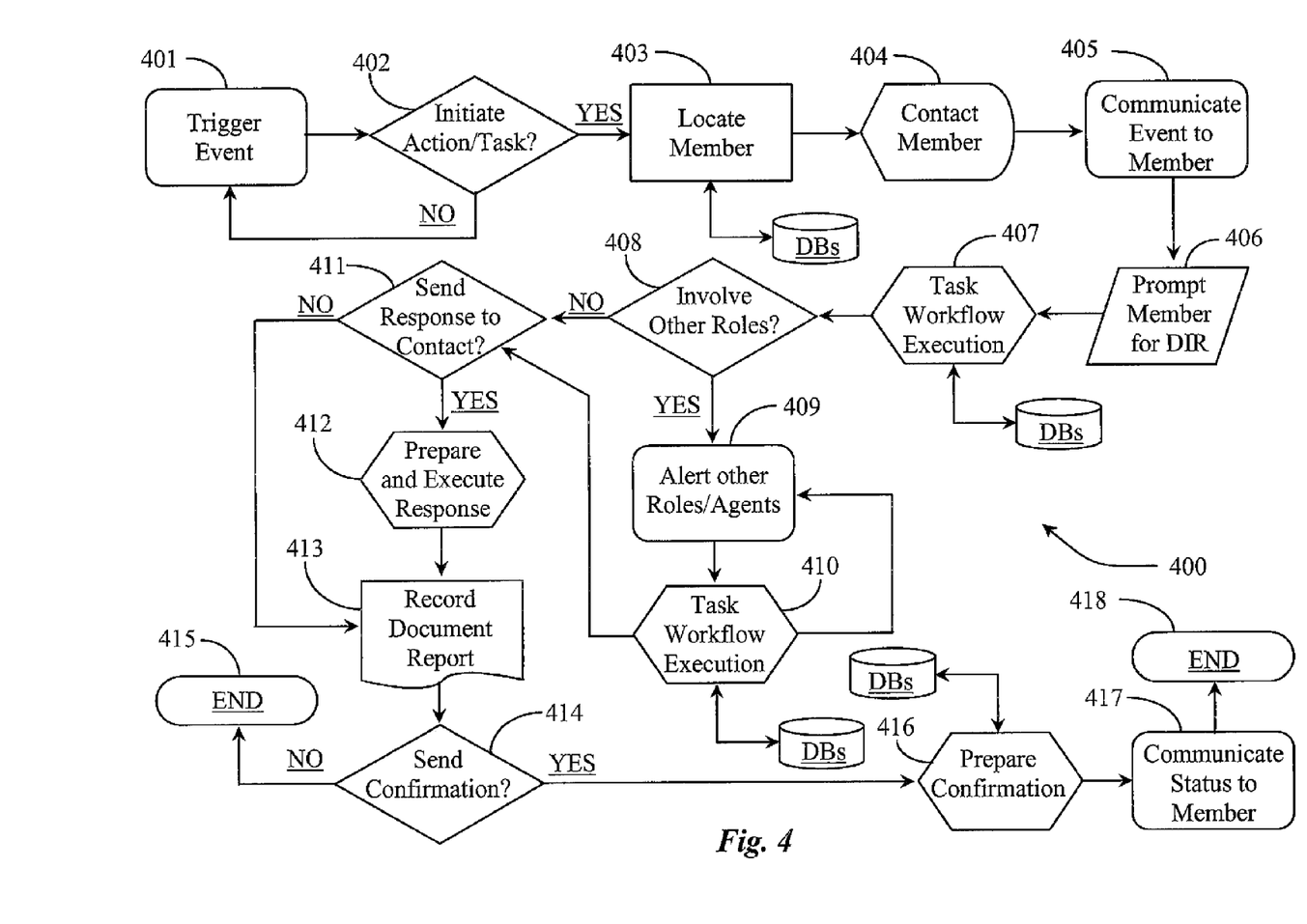
FIG. 4 is a process flow chart illustrating steps 400 for initiating and managing workflow execution according to an embodiment of the present invention.

FIG. 4 is a process flow chart illustrating steps 400 for initiating and managing workflow execution according to an embodiment of the present invention. The system of the invention can perform tasks and execute workflows as previously described. This may occur based on some trigger event received or perceived by an Active Agent associated with a user. At step 401a trigger event is received or perceived by the system. The system is, in this case, analogous to appliance 300 described further above.

At step 402, the system determines if based on the trigger event, it is to initiate a task or action. If not, the process may resolve back to the beginning at step 401 for a next trigger event. In this embodiment, the trigger event may be an anticipated message that identifies a recipient like an email message for example. The event may be predefined in an Active Agent preference configuration like any incoming email from a specific address that registers at an inbox.

In other cases or other instances of the system, a trigger event may be a telephone call, a notification of a state, a mark of time, or some other perceived or received trigger. Within the context of the protocol described in 403, 304, 405, 406, and 417 a "member" is analogous to a "user" as defined in the context of an Active Information Model. The exact nature of the trigger event may depend on the system type and configuration parameters describing the role and event type. In this case a member has pre-configured one or more instances of attempted contact as a trigger event.

To illustrate an example, assume that the trigger event is an email message received from a customer that is included in a special list of email addresses of customers that are important to a salesman enough that the salesman has directed the system to alert the salesman if any on the list send an email to him. By virtue of the message destination address the specific user in the Active Information Model (the member) is identified and the system already knows who the member is that is the recipient of the email. An Active Agent for that user (member) is spawned based on receipt of the trigger event, which identifies the user (member).

At step 402 if the system determines a task or action is to be performed based on the trigger event, at step 403, the member is located by performing a table lookup to determine, perhaps itinerary, physical location, mobile state, device state, device number and so on. A presence information server may be accessed in some cases to determine location of the member. An updated database may report that the member is on the road to a sales seminar and will only be available via cell number. The member has pre-configured this data into the system and the data is date and time sensitive such as information on a calendar of appointments. Therefore, the system may locate the member based in part on pre-configured data and in part using a presence information protocol to report, for example, if the member's cell phone is accepting calls.

At step 404, assuming that the member is answering calls at a specific cell phone number, the system initiates a call to the member's cell number. If the number is busy or the phone is not taking calls, then the system may look for other devices and communication channels over which the member might be contacted or alerted of the trigger event.

In this example, at step 404, the system calls the member on the cellular telephone. At step 405, the system communicates the event to the member. In this case text-to-voice may be used to prepare a synthetically recorded telephone audio message informing the member of the newly arrived email and reading the contents of the email over an established voice connection to the member.

Communicating the event to the member at step 405 may well entail a voice rendering of the email made by an automated outbound contact system. The interaction may continue at step 406 where the voice system may prompt the member for direction. A task or workflow execution is based entirely on the direction given by the member at step 406 and ensues accordingly at step 407. The task or workflow to be performed is already defined by the "role" of the member contacted at step 404. Database icons are associated with steps where data access is presumed.

A task performed at step 407 may be a simple task like get form. Also at step 407, the system may populate the form. The form may be a template for a written agreement or contract selected by the member from voice prompting and the system may automatically populate the form with as much information as is already known about the customer. The member may also offer voice input for population to the form through the voice interface using the cell phone assuming voice recognition capabilities are present at the interface. During the voice interaction, the system has prompted the member, possibly with all of the task and workflow items to solicit from the member which item to initiate. At step 408, it is determined whether there are any other roles that are associated with the member role that the member has involved through configuration or that the enterprise Active Information Model has defined associations for.

For example, assuming a written agreement, perhaps an attorney must review and approve the agreement. Perhaps another department has to add some information to the form before or after review. Therefore at step 408, the system determines if any other roles will be involved in the workflow required to complete the task at hand. If no other roles are identified as requiring some involvement in the process at step 408, the system determines if there will be a response prepared and sent to the contact at step 411.

If determined at step 411 that no response will be sent to the contact that sent the email received in step 401, then the process skips to step 413 where the system records or otherwise documents and reports the activity to an appropriate entity like a sales force management system for example. At step 414, the system determines if a confirmation of any kind of the completed activity is to be sent back to the member. If the system determines that no confirmation is ordered then the process may end for that trigger at step 415.

If determined at step 411 that a response is to be sent back to the contact, then the response is prepared and executed at step 412. A response may be prepared on behalf of the active member such as an email confirmation of the agreement sent back to the contact. The process moves then to step 413, 414, and if a confirmation is not required, to step 415 where the process ends for that trigger.

If at step 414, a confirmation is required or requested by the member once tasks have been completed by the system, the appropriate confirmation is prepared or selected by the system at step 416. A confirmation of a service performed might be an email confirmation, an SMS confirmation, or a telephone confirmation. In one embodiment, default confirmation audio is provided and may be selected according to the task that was completed. At step 417, the status is communicated back to the member. If the task is completed before the member hangs up the telephone, the confirmation may be selected from a set of prerecorded confirmation messages and played to the member through the voice interface. The process may end at step 418 in this case after the confirmation is successfully communicated to the member.

If at step 408, other roles have to participate in the fulfillment of the specified task, at step 409 those roles or "agents" that will be involved are notified. Other roles may include those external to the host appliance facilitating an Active Agent for the role of the member. In step 409, the roles or "agents" may be notified via email, telephone, SMS, instant messaging (IM), fax, or other means.

At step 410, the notified agents fulfill their parts of the workflow execution requirements. This step may repeat several times. Workflow may be distributed among multiple Active Agent instances. The process then moves back to step 411 where the system determines if a response will be sent to the contact. If the system determines that a response must be sent to the contact, then the response is prepared and executed in step 412. The response might be a reply email sent to the contact. The response might also be a telephone call, an SMS, or some other type of communication. In one embodiment, a response to the contact may be a mailing of a contract agreement whereby the contact must receive it, sign it, notarize it and fax it back to the member who may be alerted again by the system when the fax arrives.

The process may move on to step 413 for recording, documentation and reporting of activities, and back to step 414 where the process branches according to whether a confirmation of task performance is required by the member. If yes at step 414, the system prepares a confirmation at step 416 and communicates the status to the member at step 417. The process then ends for that trigger at step 418. If no at step 414, the process ends at step 415 for that trigger.

Process 400 is exemplary of one of many possible scenarios of system user interaction. In this case an Active Agent representing the role of the member is instantiated because of the trigger email received. The content of the email is parsed, translated to voice and verbalized as synthetic voice to the member via a voice interface system that called the member according to planned workflow.

In this case, workflow is integrated with communications services based on a conditional state. The member verbally selects or directs the task(s) for the system but does so based on the content of the email and the fact that the only device the member needs to communicate with is a telephone.

Figure 5:
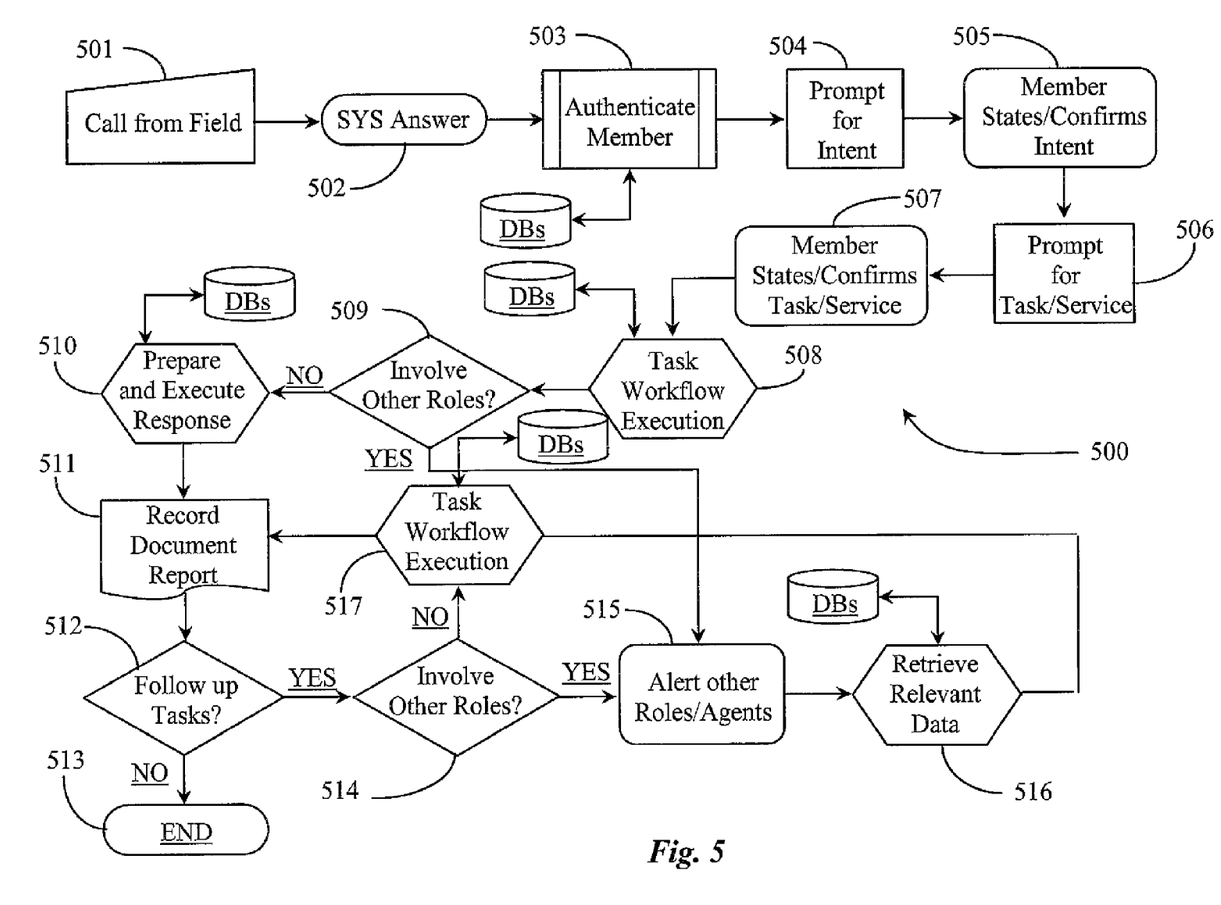
FIG. 5 is a process flow chart illustrating steps 500 for initiating and managing workflow execution according to another embodiment of the present invention.

FIG. 5 is a process flow chart illustrating steps 500 for initiating and managing workflow execution according to another embodiment of the present invention. Process steps 500 illustrate how a remote member (i.e. a user within the Active Information Model) can access the system and cause task performance using a voice interface. In this example, a member calls the system at step 501 from the field or from a mobile location. Perhaps the member is a construction site manager responsible for ordering materials and other related tasks. A role "construction site manager" would be predefined as a role in the construction firm.

At step 502, the system answers the call. In this step the call is to a voice interface such as an interactive voice response (IVR) system. At step 503, the system analogous to appliance 300 described further above authenticates the caller as a member of the information system data access and exchange service. Authentication may require a lookup in a database based on personal identification number (PIN), password, or some other authentication the voice system can recognize.

At step 504, the system prompts the member as to intent or reason for the call. There might be an options menu verbalized to the member by the IVR system wherein the member may select what the task performance option or options will be performed by an Active Agent or role of the user. In one case, the member may simply state the reason and it will be recognized by the system. After the system has recognized the reason for the call, it may repeat it for confirmation by the member at step 505. The reason might be abstract such as "Order Materials". The system can take action upon such abstract request because the Active Information Model can establish user context (role an workflow).

At step 506, the system may ask the user if "Order Materials" is correct for confirmation and then may verbalize the material choices until the member says (or indicates using DTMF input) yes to one of them. At step 507, the system may confirm the more granular task of ordering specific materials. The system may also provide selection of the proper forms for ordering materials and may solicit the quantities of each material ordered. Confirmation steps are common with voice-enabled interfaces to mitigate non-recognition however the nature of the AIM facilitates additional scope in validation such as potential preference and policy level actions to handle exception. Examples of such extended scopes are automatic help (e.g. if unable to validate input bridge to help desk) or intelligent security handling (e.g. upon detecting a breech continue a fake session while initiating a trace).

At step 508, the Active Agent representing the member role is spawned and begins the appropriate task or workflow execution. The system may determine if additional roles are required in order to complete the user-centric process at step 509. If the system determines at step 509 that no other roles are required to complete the task or workflow execution, then the system may prepare and execute a response to the member at step 510. Preparing and executing a response to a member may involve many different communications options. However, the response contains a complete confirmation of the ordered task performance. At step 511 the system may be ready to record, document, and report activities.

At step 512, the system makes a determination whether there are any follow up tasks to perform after the main task has been completed and confirmed. If at step 512 there are no follow up tasks to perform then the process may end at step 513. If there are follow up tasks to perform, the system determines if other roles will be involved at step 514. If at step 514, no other roles will be involved, then at step 517 the ordered or requested tasks or workflow is performed.

After step 517, the process moves back to step 511 for recording, documenting, and reporting. The system may make a determination if there might be any follow up tasks to perform for users. If at step 512, there are no additional tasks to perform, the process may end for that telephone call. At step 512, if the system determines that there are follow up tasks to perform, then at step 514 the system may determine if the follow up task(s) require the participation of other roles. If no other roles are required at step 514, the process moves to step 517 for task or workflow execution. A follow up task related to construction site material ordering might be setting a future reminder to check progress on material delivery.

The process loops at this point back to steps 511 and 512 until there are no more tasks to be performed and the process can end at step 513. If at steps 509 or 514 the system determines that other roles are required to complete task or workflow performance then the process moves to step 515 wherein the roles or agents required are alerted. In this way one Active Agent may request action from another Active Agent it has relation to or association with. The Active Information Model includes the roles and their task performance and workflow requirements as well as the static and conditional relationships between the roles. A construction site management role may be associated with the role defined for the architect if the construction company builds new custom homes, for example. The architect may have to review the material order before it can go out and may also be able to change the order. Another role that might be loosely associated with the architect and the construction site manager may be the client. There are many possibilities.

Process steps 500 represent one example of interaction and workflow blending that can be accomplished by a call in to the system from a remote location. There are many other interactions and workflow processes that may be accomplished some of which may depend on the system design and capabilities. For example, a file upload from the field may trigger a process including workflow or task performance. An email from a member in the field, or a process order form, or some other type of input may also be considered a trigger event in some cases. The ability to perform tasks and actions on behalf of a system user using an automated or semi-automated representation of the user that embodies the "role" of the user eliminates much work and time delay for the enterprise considering the accumulative effect of hours spent manually performing tasks and managing business processes where participation is required of the user beyond a simple interaction. Many unique processes become evident considering the many different system environments that may be implemented and conceived some of which have been described.

Figure 6:
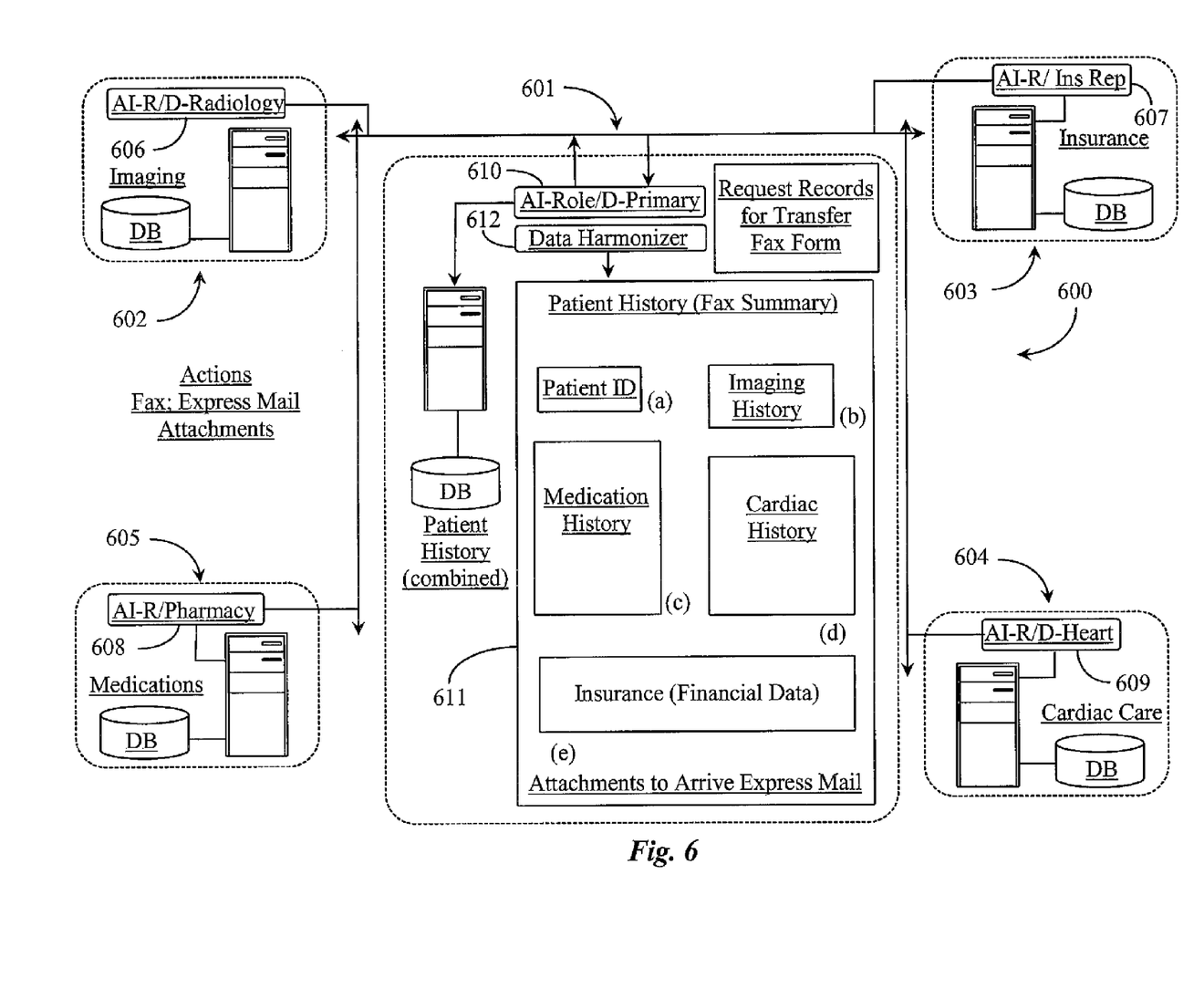
FIG. 6 is a block diagram illustrating workflow execution from multiple points in the network producing a useable single source of information.

FIG. 6 is a block diagram illustrating multi-entity cooperation in workflow execution to produce a single aggregation of information according to an embodiment of the present invention. An information access and exchange network 600 is illustrated in this example and includes multiple associated Active Agents or "roles" working within a healthcare system. An industry like long-term health care includes many independent enterprises and internal departments within an enterprise where cooperation among those entities is required in order for a customer's long term needs to be met adequately. Furthermore some departments may be externally regulated or have requirements that are dictated by various payers but depend on the specifics of the patient's condition as well as the prescribed treatment. The service of the invention enables an enterprise with multiple independent departments or a group of independent businesses to form an information access and exchange system using the Active Information Model.

In this example, a primary care facility 601 like a doctor's office for example is triggered by some event to generate a current patient history document that may be faxed over to some other facility or office that requires the information in order to continue servicing the patient without significant interruption or delay. The patient in question has patronized the health care services of all of the other roles active in the system, which in this case is designed to accommodate multiple entities or departments.

A medical imaging service business 602 is an enterprise within the information system and has an Active Information Model including roles that represent practitioners in that business. A medical insurance provider facility 603 is an enterprise within the information system and has an Active Information Model including roles that represent practitioners in that business. A cardiac care facility 604 is an enterprise within the information system and has an Active Information Model including roles representative of practitioners in that business. A pharmacy 605 is an enterprise within the information and exchange system and has an Active Information Model including roles that represent practitioners in that business.

Each entity 601 through 605 performs some viable service for the patient and information, data, and history relative to the patient from each of these entities is vitally important in the view of the overall health management of the patient. Therefore, in order to effect smooth and seamless cooperation among these disparate entities, certain roles within each of the entities have defined association and relationship to other roles within the Active Information Model. Each entity 601 through 605 keeps patient records, files, and history that is available through some computerized system including a data storage or database facility. In this case, each entity includes a database server and persistent storage. The primary care facility 601 has a role 610 which may represent the primary doctor of the patient, for example. The imaging business 602 includes a role 606 which may represent the patient's primary doctor of radiology. The pharmacy 605 includes a role, which may be the patient's pharmacist. The cardiac care facility 604 includes a role, which may be the patient's primary heart doctor. The insurance provider 603 includes a role, which may represent an authorized insurance representative for the patient.

In practice, the patient may have developed some condition that requires immediate attention and a full view of the patient's data compiled over a period of time. One way to provide all of the patient's information is to store that data in some central facility accessible to all of the entities (roles) involved in caring for the patient. In this example, however, the patient's data is distributed among several different data storage facilities maintained independently at each of the facilities.

The role of the primary physician in this example is to refer the patient to another facility (not illustrated) and to make sure that a full view of the patient's information from the primary facility and from the other illustrated facilities is prepared and sent to the new recipient. The new recipient may be a doctor or team of doctors that will offer a second opinion for the patient, for example. The new recipient might be a pulmonologist referred because of a lung abnormality discovered by the doctor that is serious enough to warrant the referral. Template 611 contains data fields that can be populated automatically with the most recent and relevant data. A predefined task specifying a specific workflow is defined under the role of the primary doctor.

In a scenario, assume that the doctor reviewing the patient's latest physical discovered a problem which led to a referral situation and that the nature of the problem required specific data categories included on the fax summary template form. But the doctor had to leave immediately to catch a plane for a seminar and could not spend the time to instruct any other support personnel in the matter.

The primary doctor could telephone the information system using a provided number, authenticate to the system and thus activate his role within the Active Information Model of the primary facility. During interaction the doctor might state or select the problem and may select the fax form and state the required data categorize to be included on the form.

In this example, the form includes category (a) patient identification including social security number, address, contact, spousal information, and any powers of attorney holders. Category (b) is the patient's medical imaging history available in the files of business 602. Category (c) is the patient's medication history available in the files of the pharmacy. Category (d) is the patient's cardiac care history available in the files of business 604. Category (e) is the patient's insurance history and associated financial data.

Using the pre-defined relationships between role 610 and the other roles generic to the other entities, the Active Agent representing the primary doctor can get the template and can retrieve the required data from the data systems of the other entities through the network interface using query response protocols. The data harmonizer appliance 612 is positioned on the network of the information system and the Active Agent representing the primary doctor can "see" the required information through its relationship with the other roles. The workflow involves getting the form, querying the other roles and ordering the data aggregation from the distributed data storage facilities to persistent or temporary data storage within facility 601.

Data harmonizer 612 analogous to appliance 300 described further above can then populate the appropriate categories on the form with the aggregated data and through a personal contact record service can acquire the correct fax number information for the fax send operation. Using an interface to a telephony-based Fax machine or to an E-fax service the appliance 612 can print to fax or electronically fax the form to the intended recipient. The exact workflow may in part be selected by the doctor interacting with the system via cellular telephone interacting with a voice application through a voice-enabled interface.

With respect to data harmonizer 612, site specific data stored in disparate formats distributed throughout the information system geography can be harmonized to present a unified view where all of the data aggregated from the separate sources can viewed in a desired format. Data retrieved from a site specific data source is abstracted to remove the generic formats so that all of the data may be re-presented in a desired format compatible with any supported format that may be required of a viewing system or platform.

Data harmonizing occurs on the fly when data is retrieved and compiled for use in reporting, presentation, or for central site storage. Reverse formatting is also supported by the framework so data updates ordered to site-specific data stores can be deposited in the format required by the site specific data store.

A follow up task might be to ensure that all of the appropriate hard files needed like actual CT scans, X-rays, and other supporting images or conclusive reports required by the recipient in hardcopies be mailed via express mail. This follow up task may be reported and established as a trigger at each of the other facilities where the hard files reside.

A confirmation email SMS or telephone call may be made to the doctor by the system to confirm that the requirements and the task was performed and that notification or confirmation may include an opportunity for the doctor to schedule a follow up visit. The recipient may be a part of the information system or not. If the recipient facility begins to do a lot of collaboration with one or more of the other facilities then it may be brought into the information system allowing the system to grow with respect to participant member facilities. Likewise facilities that no longer collaborate with certain other facilities may update their Active Information Model accordingly by redefining roles, tearing down old role associations and creating new associations.

It will be apparent to one with skill in the art that the information access and exchange service and system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A distributed information and task management system comprising:
   a plurality of enterprises or departments servers, each enterprise or department comprising one or more computerized appliances having processors executing software from a non-transitory medium, at least one physical data repository, and optionally one or more connections to wired and/or wireless telephone systems;
   a harmonizer appliance assigned to each enterprise or department;
   an external network connecting each harmonizer appliance assigned to each enterprise or department, such that communication and data exchange between users, enterprises or departments passes through and is managed by the harmonizer appliances;
   one or more servers connected to the external network, providing services to the plurality of enterprises or departments;
   a configurable active information model (AIM) unique to, and stored at or accessible to each harmonizer appliance, the AIM defining at least trigger events, user roles, and executable active agents associated uniquely with the user roles, for the enterprise or department, and to some extent modeling details of the overall distributed information and task management system,
   wherein a trigger event defined in the AIM and identified by a harmonizer appliance unique to a specific enterprise or department, received either from within the enterprise or department or over the external network connecting the harmonizer appliances, triggers the harmonizer appliance to identify a user and the user's role, to spawn the appropriate active agent associated with the user role, and to manage workflow through execution of the active agent to accomplish a purpose of the user; and
   an interface on the external network allowing access to remote participants, wherein remote participants access the distributed information system, each having an assigned role and associated active agent defined in the AIM of one of the harmonizer appliances, the active agent providing full utilization of the distributed information system including representation of the participants communicating on the network with remote devices including at least telephones, wireless devices, or personal digital assistant (PDA),
   wherein the active agents are dedicated to one or more enterprise participants with roles based on geographical assignment in the enterprise.

2. The system of claim 1 wherein the remote participants are mobile and access the network by proxy through a server for interacting with the communication network via the remote devices.

3. The system of claim 1 wherein the enterprises are part of a federated network.

* * * * *